United States Patent [19]
Sakuma et al.

[11] Patent Number: 5,504,605
[45] Date of Patent: Apr. 2, 1996

[54] LIQUID CRYSTAL DISPLAY MODULE HAVING CUT-AWAY PORTIONS OF THE BACK FRAME FOR WEIGHT REDUCTION AND HEAT DISSIPATION

[75] Inventors: Toshiyuki Sakuma; Hiroshi Nakamoto; Toru Watanabe; Shigeharu Hatayama; Toshimitsu Matsudo; Takayuki Iura, all of Mobara, Japan

[73] Assignee: Hitachi, Ltd., Tokyo, Japan

[21] Appl. No.: 250,429

[22] Filed: May 27, 1994

[30] Foreign Application Priority Data

Jun. 2, 1993 [JP] Japan .................. 5-132171

[51] Int. Cl.⁶ .................. G02F 1/1333; G02F 1/1335
[52] U.S. Cl. .................. 359/83; 359/49
[58] Field of Search .................. 359/49, 83

[56] References Cited

U.S. PATENT DOCUMENTS

| | | | |
|---|---|---|---|
| 5,146,354 | 9/1992 | Plesinger | 359/49 |
| 5,214,522 | 5/1993 | Tagawa | 359/49 |
| 5,299,038 | 3/1994 | Hamada | 359/49 |
| 5,335,100 | 8/1994 | Obata | 359/83 |
| 5,432,626 | 7/1995 | Sasuga | 359/83 |

FOREIGN PATENT DOCUMENTS

| | | | |
|---|---|---|---|
| 5066390 | 3/1993 | Japan | 359/83 |
| 5072514 | 3/1993 | Japan | 359/83 |
| 5341285 | 12/1993 | Japan | 359/83 |

*Primary Examiner*—Anita Pellman Gross
*Assistant Examiner*—Tiep H. Nguyen
*Attorney, Agent, or Firm*—Antonelli, Terry, Stout & Kraus

[57] ABSTRACT

It is possible to reduce the thickness and size of a liquid crystal display module and to suppress any display irregularity due to the heat generation of a light source, by providing a liquid crystal display module which is characterized by an upper frame 1 made of a thin stainless steel sheet and a lower frame 2 made of a thin aluminum sheet thereby to reduce the thickness of an intermediate frame 42, and to form the lower frame 2 with cut-away portions 55 and 56, which extend in a direction perpendicular to a back light source 36 over at least the area of a liquid crystal display panel 62 and which are positioned symmetrically to the line perpendicular to the center portion of the back light source 36, cut-away portions 57 and 58, which extend just below the back light source 36 in the longitudinal direction of the back light source 36, and notches 53 and 54 which are positioned below the two end portions of the back light source 36.

14 Claims, 10 Drawing Sheets

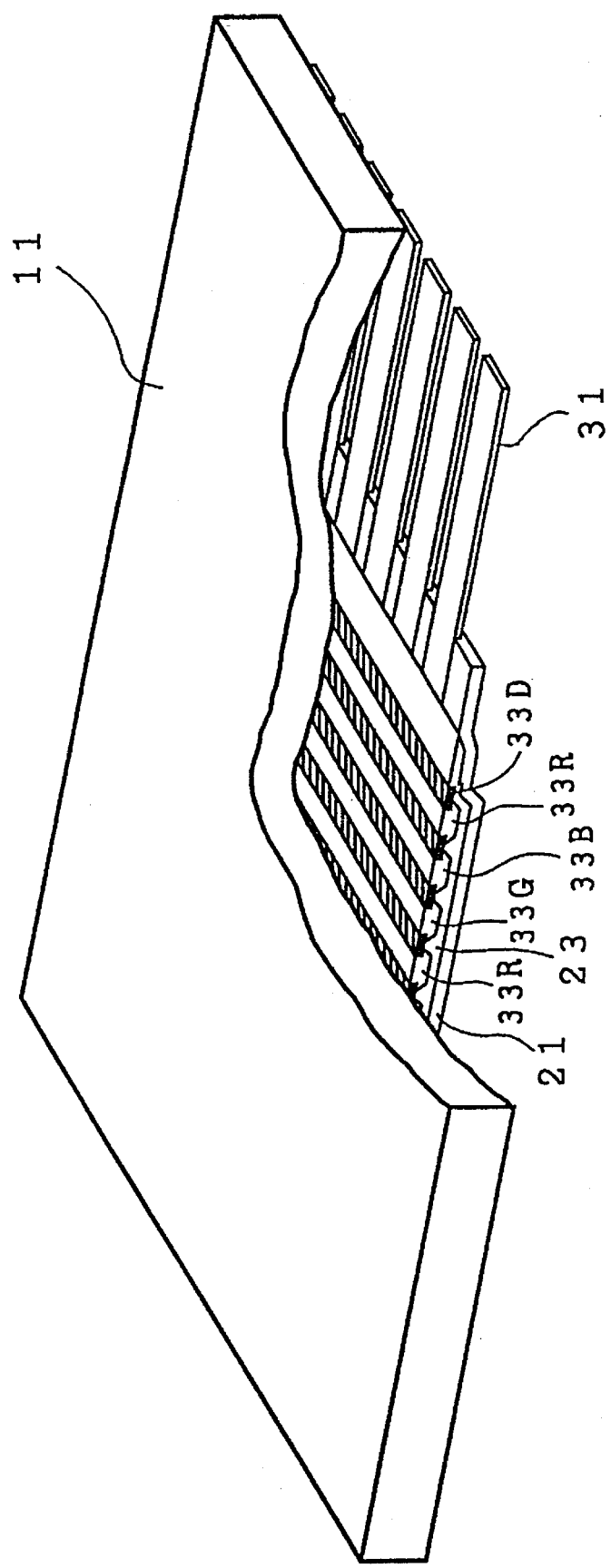

LIQUID CRYSTAL DISPLAY MODULE HAVING CUT-AWAY PORTIONS OF THE BACK FRAME FOR WEIGHT REDUCTION AND HEAT DISSIPATION

BACKGROUND OF THE INVENTION

The present invention relates to a liquid crystal display module and, more particularly, to a field effect type liquid crystal display module having excellent time sharing drive characteristics and the capability of using monochromatic and multi-color displays.

In a liquid crystal display module of the "twisted nematic type", there is formed between two electrode substrates a helical structure which is twisted by 90 degrees by a nematic liquid crystal having a positive dielectric anisotropy, and polarizing plates are so arranged on the outer sides of the two electrode substrates that their polarizing axes (or absorbing axes) are perpendicular to or in parallel with the liquid crystal molecules adjacent to the electrode substrates (as disclosed in Japanese Patent Publication No. 13666/1976).

In this liquid crystal display element having an angle of twist ($\alpha$) of 90 degrees, a problem arises not only in the steepness ($\gamma$) of the change in the transmittance of the liquid crystal layer with respect to the voltage applied to the liquid crystal layer, but also in the visual angle characteristics thereof. Thus, the time sharing number (corresponding to the number of scanning electrodes) is practically limited to 64. In order to obtain an improvement of the image quality and an increase in the amount of display data for the liquid crystal display element in recent years, however, there has been proposed a super twisted nematic (STN) module in which the angle of twist $\alpha$ of the liquid crystal molecules is made larger than 180 degrees. It has been discussed in Applied Physics Letter 45, No. 101,021, 1284 (entitled "A new, highly multiplexable liquidcrystal display" by T. J. Scheffer & J. Nehring) that the time sharing drive characteristics of such a module are improved so as to increase the time sharing number by making use of a birefringence effect in that STN. There has also been proposed a (Super-twisted Birefringence Effect) display module.

This kind of liquid crystal display module includes an upper frame having a display window; a liquid crystal display panel having a liquid crystal plate integrated with a driver substrate; a conductor assembly having an optical diffusion plate and a conductor plate; an intermediate frame equipped with a linear back light source on at least one side thereof; and a lower frame. The module is constructed by laminating the above-specified components in the recited order and by jointing and fixing the upper frame and the lower frame.

Moreover, the aforementioned upper frame and lower frames are made of thin iron sheets, and the entirety is tightly laminated by sandwiching suitable spacers or adhesive tapes, if necessary, between the above-specified individual components so that it may be fixedly integrated.

In the liquid crystal display module of the prior art, since the upper frame and the lower frame are made of thin iron sheets, the liquid crystal display module has the disadvantage that the overall module has its thickness and weight increased, thereby imposing limitations on the reduction of the thickness and weight for purpose of maintaining its rigidity, and in that the heat generated by the back light source is transferred locally to the liquid crystal display panel to invite display irregularity.

SUMMARY OF THE INVENTION

An object of the present invention is to solve the aforementioned inherent problems of the prior art and to provide a liquid crystal display module which can have its thickness and weight reduced while maintaining its entire rigidity and can suppress any display irregularity due to the heat generation of the back light source.

In order to achieve the above-specified object, a liquid crystal display module 63 of the present invention includes a metallic upper frame 1 having a display window 3; a liquid crystal display panel 62 arranged below the upper frame 1 and having a liquid crystal display element and a driver substrate 35 for the liquid crystal display element formed integrally around the liquid crystal display element; a conductor assembly 37 arranged below the liquid crystal display panel 62 and formed by laminating an optical diffusion plate and a conducting plate; an intermediate frame 42 arranged below the conductor assembly 37 for accommodating the same and formed on at least one side thereof with a space for mounting a linear back light source 36; and a lower frame 2 arranged below the intermediate frame 42 and jointed to the upper frame 1 for fixing the liquid crystal panel 62, the conductor assembly 37 and the intermediate frame 42 being arranged between the lower frame 2 and the upper frame 1, wherein the lower frame 2 is formed with cut-away portions 57 and 58 of predetermined shapes, which extend just below the back light source 36 in the longitudinal direction of the back light source 36.

Moreover, the cut-away portions 57 and 58 are formed such that the ratio of the area ($S_1+S_2+S_3$) of the lower frame 2, which is formed just below the back light source 36, to the area (L) occupied by the back light source 36 is set to 10% to 50%. In a more preferable mode, the cut-away portions 57 and 58 are formed such that the ratio of the area ($S_1+S_2+S_3$) of the lower frame 2, which is formed just below the back light source 36, to the area (L) occupied by the back light source 36 is set to about 30%.

The present invention is further characterized in that the lower frame 2 is formed with notches 53 and 54 in positions corresponding to the two end portions of the back light source 36. In this mode, the cutaway portions 57 and 58 and notches 53 and 54 are formed such that the ratio of the area ($S_1+S_2+S_3$) of the lower frame 2, which is formed just below the back light source 36, to the area (L) occupied by the back light source 36 is set to 10% to 50%. In a more preferable mode, the cut-away portions 57 and 58 and the notches 53 and 54 are formed such that the ratio of the area ($S_1+S_2+S_3$) of the lower frame 2, which is formed just below the back light source 36, to the area (L) occupied by the back light source 36 is set to about 30%.

The present invention is further characterized in that the lower frame 2 is formed with cut-away portions 55 and 56 of predetermined shapes, which extend through the back light source 36 over the area corresponding to the liquid crystal display panel 62 and which are positioned symmetrically to the line perpendicular to the longitudinal direction of the back light source 36. In this case, the cut-away portions 55 and 56 are formed such that the ratio of the area of the lower frame 2, which is formed below the liquid crystal display panel 62, to the area occupied by said liquid crystal display panel 62 is set to 10% to 50%. In a more preferable mode, the cut-away portions 55 and 56 are formed such that the ratio of the area (L) of the lower frame 2 formed below the liquid crystal display panel 62 to the area ($S_4+S_5+S_6$) occupied by the liquid crystal display panel 62 is set to about 30%.

The present invention is characterized by a combination of the above-specified characteristics suitably or by adopting one of them, and in that the upper frame 1 is made of a thin stainless steel sheet whereas the lower frame 2 is made of a thin aluminum sheet.

Thanks to the cut-away portions 57 and 58 or the notches 53 and 54 formed in the lower frame 2, as described above, it is possible to prevent any reduction of brightness by reducing the "leakage current" and the heat dissipation and to make the temperature distribution of the liquid crystal display panel 62 more uniform. Thanks to the cut-away portions 55 and 56, it is possible to make the temperature distribution of the liquid crystal display panel 62 more uniform by improving the heat dissipation and to reduce the weight of the liquid crystal display module. As described above, moreover, more preferable effects can be attained in the strength of the frame and in the brightness of the back light source by forming the aforementioned cut-away portions 51 and 58 and notches 53 and 54 such that the area ($S_1+S_2+S_3$) of said lower frame formed just below the back light source 36 to the area (L) occupied by the back light source 36 is set to 10% to 50% (more preferably about 30%), and by forming the aforementioned cut-away portions 55 and 56 such that the area of the lower frame 2 formed below the aforementioned liquid crystal display panel 62 to the area occupied by said liquid crystal display panel 62 is set to 10% to 50% (more preferably about 30%). Moreover, the upper frame 1 is made of a thin stainless steel sheet, whereas the lower frame 2 is made of a thin aluminum sheet, so that the rigidity can be enhanced while reducing the thickness of the intermediate frame 42 thereby to reduce the overall weight of the liquid crystal display module.

The foregoing and other objects, advantages, manner of operation and novel features of the present invention will be more readily understood from the following detailed description when read in connection with the accompanying drawings.

BRIEF DESCRIPTION OF THE DRAWINGS

FIG. 9 is a partially cut-away perspective view of an upper electrode substrate in the liquid crystal display module according to the present invention;

DESCRIPTION OF THE PREFERRED EMBODIMENTS

Here will be described in detail in the following in connection with its embodiments with reference to the accompanying drawings.

Figure 1:
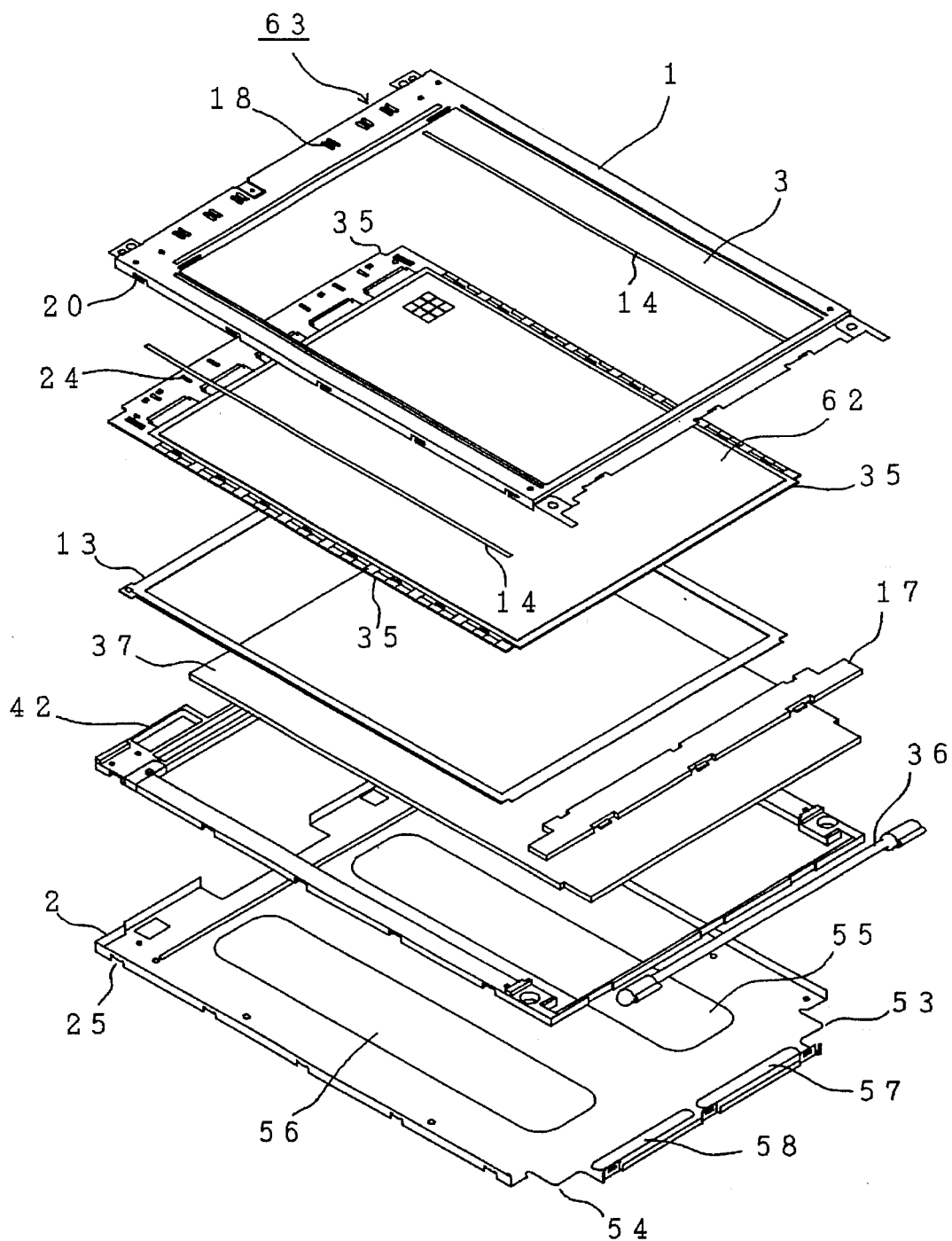
FIG. 1 is an expanded perspective view of a liquid crystal display module according to one embodiment of the present invention.

FIG. 1 is an expanded perspective view for explaining the construction of a liquid crystal display module 63 according to the present invention. Reference numeral 1 designates an upper frame; numeral a liquid crystal display window; numeral 62 a liquid crystal display panel; numeral 35 a driver substrate; numeral 13 a spacer; numeral 37 an optical conductor assembly composed of an optical diffusion plate, a conducting plate and a reflecting plate; numeral 42 an intermediate frame having a linear back light source mounted thereon; numeral 36 a linear back light source (or lamp) composed of a cold-cathode tube; numeral 17 a lamp cover; and numeral 2 a lower frame.

Moreover, numeral 18 designates raised ears to be brought into contact with ground pads 24 formed at the driver substrate 35; numeral 20 pawls to be fixed on pawl retainers 25 formed in the lower frame 2; numeral 14 an adhesive tape for fixing the upper frame 1 and the liquid crystal display panel 62; numerals 55 and 56 cut-away portions formed in symmetrical positions with respect to a line perpendicular to the central portion of the back light; numerals 57 and 58 cut-away portions formed in the longitudinal direction of the back light source 36; and numerals 53 and 54 notches formed below the two end portions of the back light source 36. Still moreover, the upper frame 1 is made of a steel sheet having a thickness of 0.8 mm, and the lower frame 2 is made of an aluminum sheet having a thickness of 0.5 mm.

In FIG. 1, the liquid crystal display panel 62 is sandwiched between the upper frame 1 and the lower frame 2 in the order, as shown. The intermediate frame 42 is equipped at its one end side with the linear light source (or back light source) 36 made of a cold-cathode tube, which has its direct light omitted toward the liquid crystal display panel 62 shielded by the lamp cover 17, so that its emitted light may be directed toward the conductor assembly 37 composed of an optical diffusion plate and a conducting plate.

The spacer 13 is sandwiched between the conductor assembly 37, which is mounted in the recess formed in the intermediate frame 42, and the liquid crystal display panel 62 to establish a display area.

The upper frame 1 is made of a thin stainless steel sheet, and the lower frame 2 is made of a thin aluminum sheet. The lower frame 2 is formed with at least one pair of cut-away portions 55 and 56, which extend in a direction perpendicular to the back light source 36 over at least the area of the liquid crystal display panel 62 and which are positioned symmetrically to the line perpendicular to the center portion of the back light source 36. The lower frame 2 is further formed with at least two cut-away portions 57 and 58, which extend just below the back light source 36 in the longitudinal direction of the back light source 36. Further, the lower frame 2 is provided with notches 53 and 54, which are positioned below the two end portions of the back light source 36.

As described above, according to the present embodiment, the upper frame 1 is made of a thin stainless steel sheet, and the lower frame 2 is made of a thin aluminum sheet, so that the liquid crystal display module can be made thin and light without having its rigidity reduced. At the same time, the heat dissipation effect can be improved to establish a uniform temperature distribution all over the surface, thereby to prevent any display irregularity, by use of the cut-away portions 55 and 56, which extend in a direction perpendicular to the back light source 36 over at least the area of the liquid crystal display panel 62 and which are positioned symmetrically to the line perpendicular to the center portion of the back light source 36, by use of the cut-away portions 57 and 58, which extend just below the back light source 36 in the longitudinal direction of the back light source 36, and by use of the notches 53 and 54, which are positioned below the two end portions of the back light source 36.

Moreover, the back light source 36 is driven by high-frequency waves so that an electric current flows from the back light source 36 to the lower frame 2 through a stray capacity between the lower frame 2 and the back light source 36. This current is called a "leakage current". Since the electric current to contribute to a lighting operation of the back light source 36 is reduced by that "leakage current", the brightness accordingly drops. On the other hand, the back light source 36 generates heat if it is lit for a long time period, so that the temperature in the vicinity thereof grows higher than the room temperature. If no counter-measure is taken, the heat in the vicinity of the back light source 36 exerts direct influences upon the liquid crystal display panel 62 so that the temperature distribution of the liquid crystal display panel cannot be made uniform. In the aforementioned embodiment, therefore, the cut-away portions 57 and 58 are formed to prevent the reduction of the brightness due to the "leakage current" so that the temperature distribution of the liquid crystal display panel may be made uniform to prevent display irregularity. Moreover, the cut-away portions 57 and 58 can prevent the brightness from being reduced by the thermal dissipation of the back light source 36.

On the other hand, the two end portions of the back light source 36 are locally reduced in brightness by the temperature drop so that their temperature has to be raised so that the temperature distribution of the liquid crystal display panel 62 can be kept uniform. Thus, the notches 57 and 58 are formed to prevent the brightness reduction while making the temperature distribution of the liquid crystal display panel 62 more uniformed. The notches 57 and 58 can functionally achieve the same effects as those of the aforementioned cut-away portions.

On the other hand, the cut-way portions 55 and 56, which are formed to extend over the area of the liquid crystal display panel 62 and are positioned symmetrically to the line perpendicular to the center portion of the back light source 36, can reduce the weight of the lower frame 2 and uniform render the temperature distribution of the liquid crystal display panel 62 more uniform.

Further description will be made on the area ratios of the cut-away portions 57 and 58, the notches 53 and 54 and the cut-away portions 55 and 56, as described above, to the lower frame 2.

Figure 2:
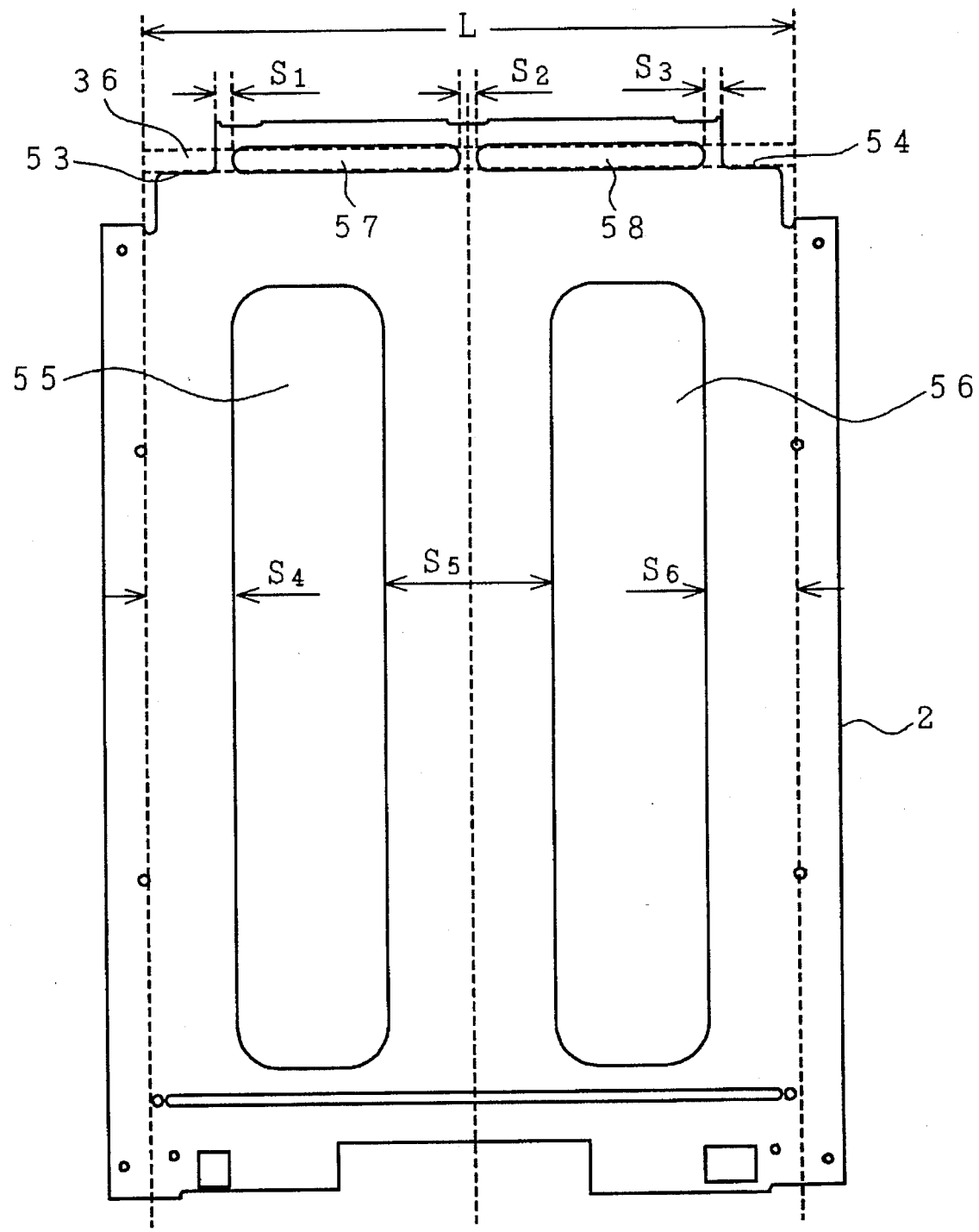
FIG. 2 is a top plain view showing a lower frame constituting the liquid crystal display module according to the present invention.

FIG. 2 is a top plan view showing the lower frame 2. The aforementioned cut-away portions 57 and 58 and notches 53 and 54 are arranged at specified positions with respect to the back light source 36. This back light source 36 is equipped with a power supply cable, although not shown, which is arranged generally in parallel with the back light source 36. If it is assumed that the length of the back light source 36 and the power supply cable are designated at L, the portions, in which the lower frame 2 excepting the cut-away portions 57 and 58 and the notches 53 and 54 are present, can be designated at $S_1$, $S_2$ and $S_3$. The present invention is characterized in that the ratio of the portion $(S_1+S_2+S_3)$, in which the lower frame 2 is present, to the portion (L), in which the fluorescent lamp and the power supply cable of the back light source 36 are arranged, is set to 10% to 50% (preferably about 30%). This can be expressed in the following relationship: $0.1 \leq (S_1+S_2+S_3)/L \leq 0.05$.

Since the cut-away portions 57 and 58 and the notches 53 and 54 are formed at the above-specified ratio, the reduction of the brightness due to the "leakage current" or the heat dissipation can be prevented to achieve more effectively the prevention of any display irregularity by means of the uniform temperature distribution of the liquid crystal display panel.

As to the cut-away portions 55 and 56, too, the area ratio to the conductor assembly is an important point, as viewed from the standpoint of making the temperature distribution of the liquid crystal display panel more uniform.

Specifically, the prevention of the display irregularity by making the temperature distribution of the liquid crystal display panel more uniform can be achieved more effectively by setting the ratio of the portion, in which the lower frame 2 is present to the portion, in which the conductor assembly 37 is arranged, to 10% to 50% (preferably about 30%). This can be expressed in the following relationship: $0.1 \leq (S_4+S_5+S_6)/L \leq 0.5$, if the width of the liquid crystal display element of the liquid crystal display panel 62 or the width of the conductor assembly 37 is designated at L, and if the portions, in which the lower frame 2 is present to correspond to the arranged portion of the conductor assembly 37, are designated at $S_4$, $S_5$ and $S_6$.

Here will be described specific embodiments in which the construction described above is applied to a liquid crystal display module of super-twisted nematic (STN) type. Incidentally, those portions having identical functions are designated by common reference numerals, and their repeated description will be omitted.

[Specific Embodiment 1]

Figure 3:
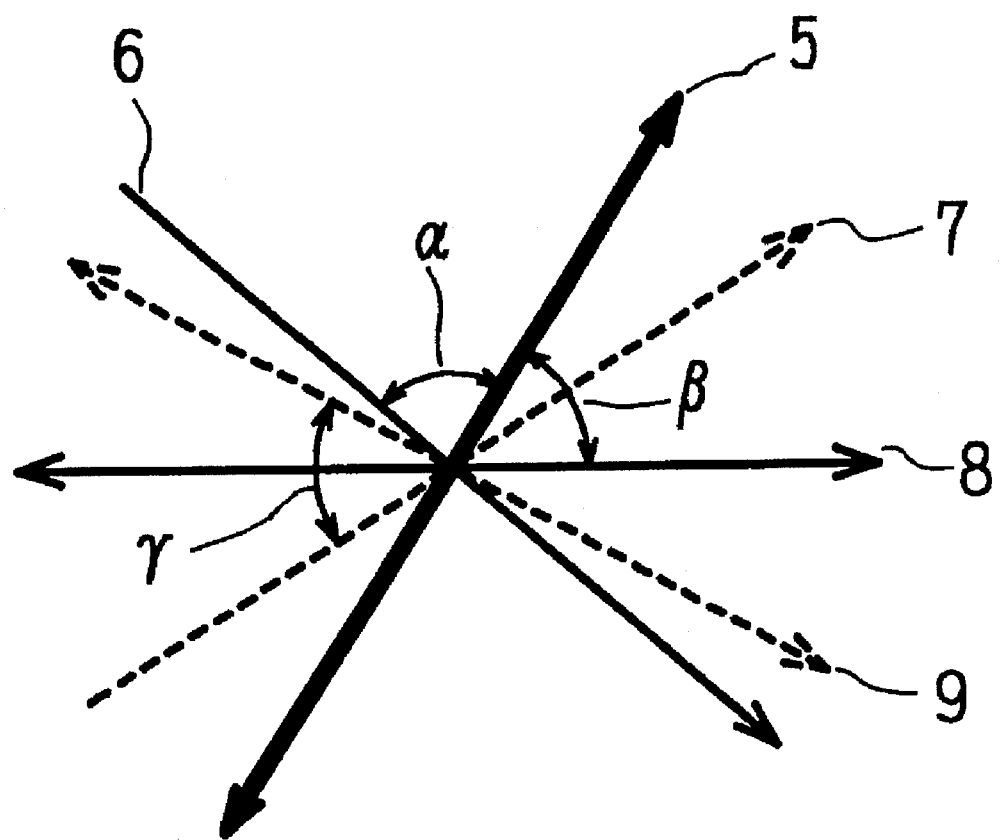
FIG. 3 is an explanatory diagram illustrating the relations among the array directions of liquid crystal molecules, the twisting direction of liquid crystal molecules, the axial directions of polarizing plates and the optical axis of a birefringent member of Specific Embodiment 1 of the liquid crystal display module according to the present invention.
Figure 4:
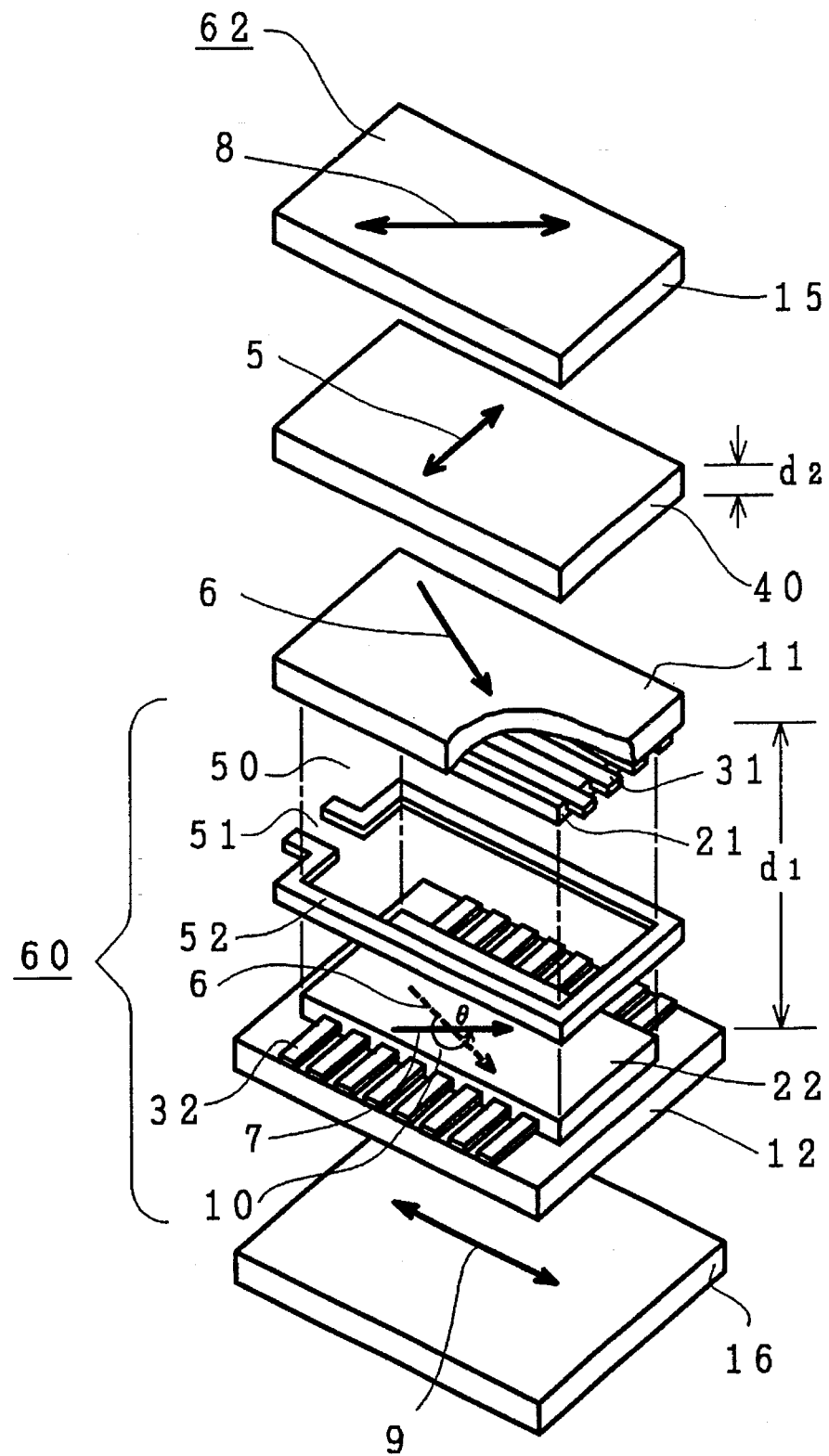
FIG. 4 is a perspective view showing an essential portion of the laminated structure of the components of the liquid crystal display module according to the present invention.

FIG. 3 is an explanatory diagram illustrating the array directions (e.g., rubbing directions) of liquid crystal molecules, the twisting direction of liquid crystal molecules, the directions of the polarizing axes (or absorbing axes) of polarizing plates, and the direction of the optical axis of a member having a birefrigence effect, by taking a top plan view of the liquid crystal display panel 62 according to the present invention, and FIG. 4 is a perspective view showing an essential portion of the liquid crystal display panel 62 according to the present invention.

The twisting direction 10 and the angle of twist θ of liquid crystal molecules are regulated by the rubbing direction 6 of an oriented film 21 on an upper electrode substrate 11, by the rubbing direction 7 of an oriented film 22 on a lower electrode substrate 12, and by the kind and amount of an optically active substance to be added to a nematic liquid crystal layer 50 sandwiched between the upper electrode substrate 11 and the lower electrode substrate 12.

In order that the liquid crystal molecules may be oriented to have a twisted helical structure between the two upper and lower electrode substrates 11 and 12 sandwiching the liquid crystal layer 50, as shown in FIG. 4, there is adopted the so-called "rubbing method" of rubbing the surfaces of such oriented films 21 and 22 on the upper and lower electrode substrates 11 and 12 in one direction with a cloth or the like in contact with the liquid crystal and as are made of an organic high-molecular resin, such as polyimide. The rubbing directions at this time, i.e., the rubbing direction 6 in the upper electrode substrate 11 and the rubbing direction 7 in the lower electrode substrate 12 are in the array directions of the liquid crystal molecules.

The two upper and lower electrode substrates 11 and 12 thus oriented are so opposed through a gap $d_1$ to each other that they intersect with each other at their individual rubbing directions 6 and 7 at an angle of about 180 degrees to 360 degrees, and are adhered to each other by a framed sealing member 52 which is formed with a notch 51 for injecting the liquid crystal. When the gap is filled up with a nematic liquid crystal to which is added a predetermined amount of an optically active substance having a positive dielectric anisotropy, the liquid crystal molecules are so arrayed between those electrode substrates as to have a helical structure of the shown angle of twist θ. Incidentally, reference numerals 31 and 32 designate upper and lower electrodes, respectively.

Over the upper electrode substrate 11 of a liquid crystal cell 60 thus constructed, there is arranged a member (as will be called the "birefringent member") 40 having a birefringent effects. Upper and lower polarizing plates 15 and 16 are further provided across this member 40 and the liquid crystal cell 60.

The angle of twist θ of the liquid crystal molecules in the liquid crystal 50 is preferably at 200 degrees to 300 degrees, but more preferably falls within a range of 230 degrees to 270 degrees from the practical standpoint to avoid the phenomenon that the lighting state in the vicinity of the threshold value in the curve of transmission—applied voltage is oriented to scatter the light so that excellent time sharing characteristics may be maintained.

This condition basically acts to make the response of the liquid crystal molecules more sensitive to the voltage thereby to realize the excellent time sharing characteristics. In order to achieve an excellent display quality, on the other hand, the product $\Delta n_1 \cdot d_1$ of the refractive index anisotropy $\Delta n_1$ and the thickness $d_1$ of the liquid crystal layer 50 is desirably set preferably within a range of 0.5 μm to 1.0 μm, and more preferably within a range of 0.6 μm to 0.9 μm.

The birefringent member 40 acts to modulate the polarized state of the light to be transmitted through the liquid crystal cell 60 thereby to convert the colored display of only the liquid crystal cell 60 to a monochromatic display. For this conversion, the product $\Delta n_2 \cdot d_2$ of the refractive index anisotropy $\Delta n_2$ and the thickness of the birefringent member 40 is very important and is set preferably within a range of 0.4 μm to 0.8 μm, and more preferably within a range of 0.5 μm to 0.7 μm.

Moreover, the liquid crystal display panel 62 according to the present invention utilizes elliptical polarization resulting from the birefringence. In case, therefore, a uniaxial transparent birefrigent plate is used as the birefringent member 40, the relations among the axes of the polarizing plates 15 and 16, the optical axis of the birefringent member 40, the array directions 6 and 7 of the electrode substrate 11 and 12 of the liquid crystal cell 60, are extremely important.

Here will be described the operations and effects of the aforementioned relations with reference to FIG. 3. This Figure illustrates the relations of the axes of the polarizing plates, the optical axis of the uniaxial transparent birefringent member, and the array directions of the liquid crystal molecules of the electrode substrates of the liquid crystal cell by taking a top plan view of the liquid crystal display module having the construction of FIG. 4.

In FIG. 3, reference numeral 5 designates the optical axis of the uniaxial transparent birefringent member 40; numeral 6 the array direction of the liquid crystal of the birefringent member 40 and the upper electrode substrate 11 adjacent to the former; numeral 7 the array direction of the liquid crystal of the lower electrode substrate 12; numeral 8 the axis of absorption or polarization of the upper polarizing plate 15; letter α an angle made between the liquid crystal array direction 6 of the upper electrode substrate 11 and the optical axis 5 of the uniaxial birefringent member 40; letter β an angle made between the axis of absorption or polarization 8 of the upper polarizing plate 15 and the optical axis 5 of the uniaxial transparent birefringent member 40; and letter γ made between the axis of absorption or polarization 9 of the lower polarizing plate 16 and the liquid crystal array direction 7 of the lower electrode substrate 12.

Here will be defined the manner to measure the aforementioned angles α, β and γ. The description will be made by exemplifying the angle of intersection between the optical axis 5 of the birefringent member 40 and the liquid crystal array direction 6 of the upper electrode substrate 11 with reference to FIG. 8.

Figure 8A:
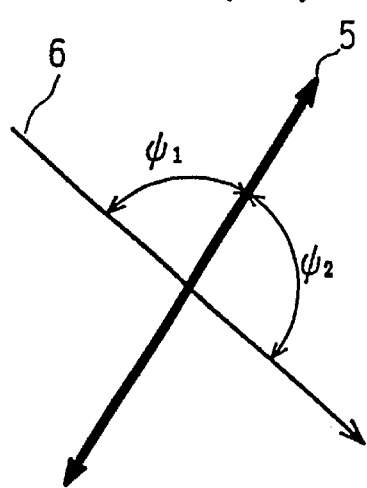
FIG. 8 a diagram for explaining how to measure intersectional angles $\alpha$, $\beta$ and $\gamma$ in the liquid crystal display module according to the present invention.
Figure 8B:
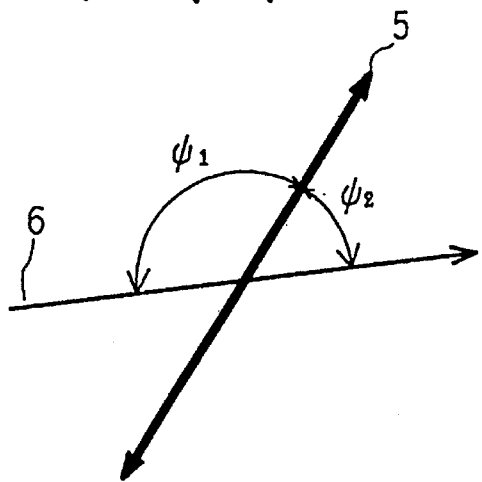

The intersectional angle between the optical axis and the liquid crystal array direction 6 can be expressed by $\phi_1$ and $\phi_2$, as shown in FIG. 8, and the smaller of these angles will be adopted. Specifically, in the case of FIG. 8(a), the angle $\phi_1$ is adopted as the intersectional angle between the optical axis 5 and the liquid crystal array direction 6, because $\phi_1 < \phi_2$. In the case of FIG. 8(b), the angle $\phi_1$ is adopted as the intersectional angle between the optical axis 5 and the liquid crystal array direction 6, because $\phi_1 > \phi_2$. Either of these may naturally be adopted in case $\phi_1 = \phi_2$.

In this kind of liquid crystal display module, the angles α, β, and γ are extremely important. Of these, the angle α is desirably set preferably within a range of 50 degrees to 90 degrees, and more preferably within a range of 70 degrees to 90 degrees; the angle β is desirably set preferably within a range of 20 degrees to 70 degrees, and more preferably with in a range of 30 degrees to 60 degrees; and the angle γ is desirably set preferably within a range of 0 degrees to 70 degrees, and more preferably within a range of 0 degrees to 50 degrees.

Incidentally, no matter whether the twisting direction 10 is clockwise or counter-clockwise, the aforementioned angles α, β and γ may be within the above-specified ranges if the twist angle θ of the liquid crystal layer 50 of the liquid crystal cell 60 is within a range of 180 degrees to 360 degrees.

The birefringent member 40 is arranged between the upper polarizing plate 15 and the upper electrode substrate 11 in FIG. 4, but may be arranged between the lower electrode substrate 12 and the lower polarizing plate 16. In this modification, the construction of FIG. 4 is inverted in its entirety.

[Specific Embodiment 2]

Figure 5:
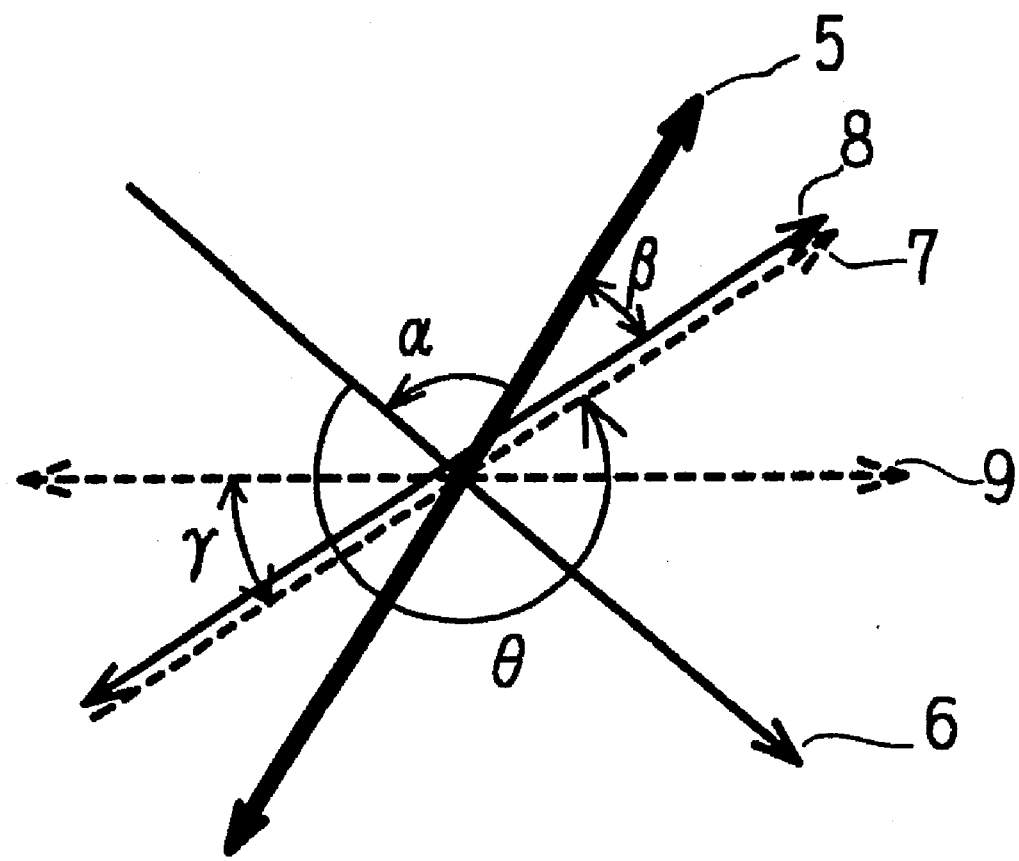
FIG. 5 is an explanatory diagram illustrating the relations among the array directions of liquid crystal molecules, the twisting direction of liquid crystal molecules, the axial directions of polarizing plates and the optical axis of a birefringent member of Specific Embodiment 2 of the liquid crystal display module according to the present invention.

The basic structure is similar to that shown in FIGS. 3 and 4. In FIG. 5, the angle of twist θ of the liquid crystal molecules is 240 degrees, and the uniaxial transparent birefringent member 40 used is exemplified by a liquid crystal cell having a parallel array (i.e., a homogeneous array), namely, a twist angle of 0 degrees.

Here, the ratio of the thickness d (μm) of the liquid crystal layer to the helical pitch p (μm) of the liquid crystal material having an optically active substance added thereto was set at about 0.53. The oriented films 21 and 22 used were polyimide resin films and were subjected to the rubbing treatment. These rubbed oriented films had a tilt angle (i.e., pre-tilt angle) of about 4 degrees for orienting the liquid crystal molecules contacting with themselves at an inclination with respect to the substrate face. The product $\Delta n_2 \cdot d_2$ of the aforementioned uniaxial transparent birefringent member 40 is about 0.6 μm. On the other hand, the product $\Delta n_1 \cdot d_1$ of the liquid crystal layer 50 having a structure, in which the liquid crystal molecules are twisted at 240 degrees, is about 0.8 μm.

At this time, by setting the angles α, β and γ to about 90 degrees, about 30 degrees and about 30 degrees, respectively, it was possible to realize a monochromatic display, in which the light was not transmitted to display a black color if the voltage to be applied through the upper and lower electrodes 31 and 32 to the liquid crystal layer 50 was not more than the threshold value; whereas, the light was transmitted to display a white color if the voltage exceeded a certain threshold value. In case, moreover, the axis of the lower polarizing plate 16 was turned by an angle from 50 degrees to 90 degrees from the aforementioned position, a monochromatic display which is reversed from the aforementioned one could be realized, in which a white color was displayed if the voltage applied to the liquid crystal layer 50 was not more than the threshold value; whereas, a black color was displayed if the voltage exceeded the threshold value.

Figure 6:
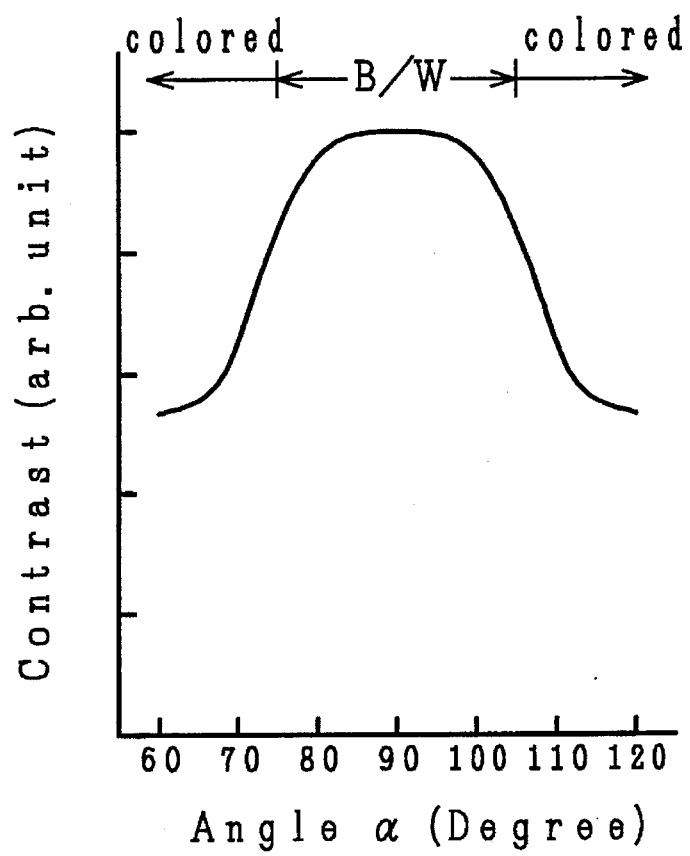
FIG. 6 is a graph plotting the contrast characteristics of Specific Embodiment 2 of the liquid crystal display module according to the present invention against an intersectional angle $\alpha$ for the colors of transmission light.

FIG. 6 plots the contrast change at the time sharing drive of 1/200 duty when the angle α was changed with the construction of FIG. 5. A remarkably high contrast was exhibited at the angle α in the vicinity of 90 degrees, but the contrast dropped to the lower value for the larger discrepancy from that angle. Moreover, both the lighting portion and the non-lighting portion grow to be more bluish as the angle α becomes the smaller, but the non-lighting portion grows to be more violet whereas the lighting portion grows to be more yellow, as the angle α becomes the larger. In either case, a monochromatic display became impossible. Substantially similar results were obtained for the angle β and the angle γ. In the case of angle γ, however, a reversed monochromatic display was obtained, as described above, if the angle was turned by 50 degrees to 90 degrees.

[Specific Embodiment 3]

The basic structure is similar to that of the foregoing "Specific Embodiment 2", but is different in that the angle of twist of the liquid crystal molecules of the liquid crystal layer 50 is at 260 degrees, and in that the product $\Delta n_1 \cdot d_1$ is about 0.65 μm to 0.75 μm. However, the product $\Delta n_2 \cdot d_2$ of the parallel oriented liquid crystal layer used as the uniaxial transparent birefringent member 40 retains about 0.58 μm, which is equal to that of the "Specific Embodiment 2".

At this time, a monochromatic display similar to that of the foregoing "Specific Embodiment 1" could be realized by setting the angle α to about 100 degrees, the angle β to about 35 degrees, and the angle γ to about 15 degrees. Moreover, it is similar to the "Specific Embodiment 2" in that the monochromatic display could be reversed by turning the position of the axis of the lower polarizing plate by 50 degrees to 90 degrees from the above-specified values. The inclinations with respect to the shifts of the angles α, β and γ are substantially similar to those of the "Specific Embodiment 2".

In any of the preceding Specific Embodiments, the uniaxial transparent birefringent member 40 used was exemplified by a parallel oriented liquid crystal cell having no liquid crystal molecule that was twisted. The color change depending upon the angle is rather reduced if there is used a liquid crystal layer in which the liquid crystal molecules are twisted by about 20 degrees to 60 degrees. The liquid crystal layer thus twisted is formed like the aforementioned liquid crystal layer by sandwiching a liquid crystal between a pair of oriented transparent substrates which have orientations which are caused to intersect at a predetermined angle of twist. In this case, the direction of a bisector of the included angle of two orienting directions, including the twisted structure of the liquid crystal molecules, may be handled as the optical axis of the birefringent member.

Moreover, the birefringent member 40 may be made of a transparent high-molecular film (preferably, a monoaxially stretched type). The high-molecular film effective in this case is exemplified by PET (i.e., polyethylene terephthalate), an acrylic resin or polycarbonate.

In the foregoing Specific Embodiments, still moreover, the birefringent member is one sheet, but another sheet of birefringent member can be inserted in addition to the birefringent member 40 between the lower electrode substrate 12 and the upper polarizing plate 16, as shown in FIG. 4. In this modification, the product $\Delta n_2 \cdot d_2$ may be readjusted.

[Specific Embodiment 4]

Figure 7:
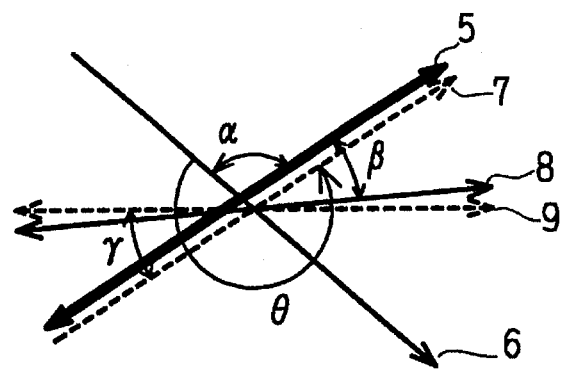
FIG. 7 is an explanatory diagram illustrating the relations among the array directions of liquid crystal molecules, the twisting direction of liquid crystal molecules, the axial directions of polarizing plates and the optical axis of a birefringent member of Specific Embodiment 4 of the liquid crystal display module according to the present invention.

The basic structure is similar to that of "Specific Embodiment 2". However, a multi-color display can be achieved by mounting red, green and blue color filters 33R, 22G and 33B on the upper electrode substrate 11 and by sandwiching an optical shielding film 33D between the individual filters, as shown in FIG. 9. FIG. 7 illustrates the relations among the array directions of liquid crystal molecules, the twisting direction of liquid crystal molecules, the axial directions of polarizing plates and the optical axis of a birefringent member of "Specific Embodiment 4".

Incidentally, on the individual color filters 33R, 22G and 33B and the optical shielding film 33D, as shown in FIG. 9, there is formed a smoothing layer 23, which is made of an insulator for reducing the influences of their undulations and over which are formed the upper electrode 31 and the oriented film 21.

Figure 10:
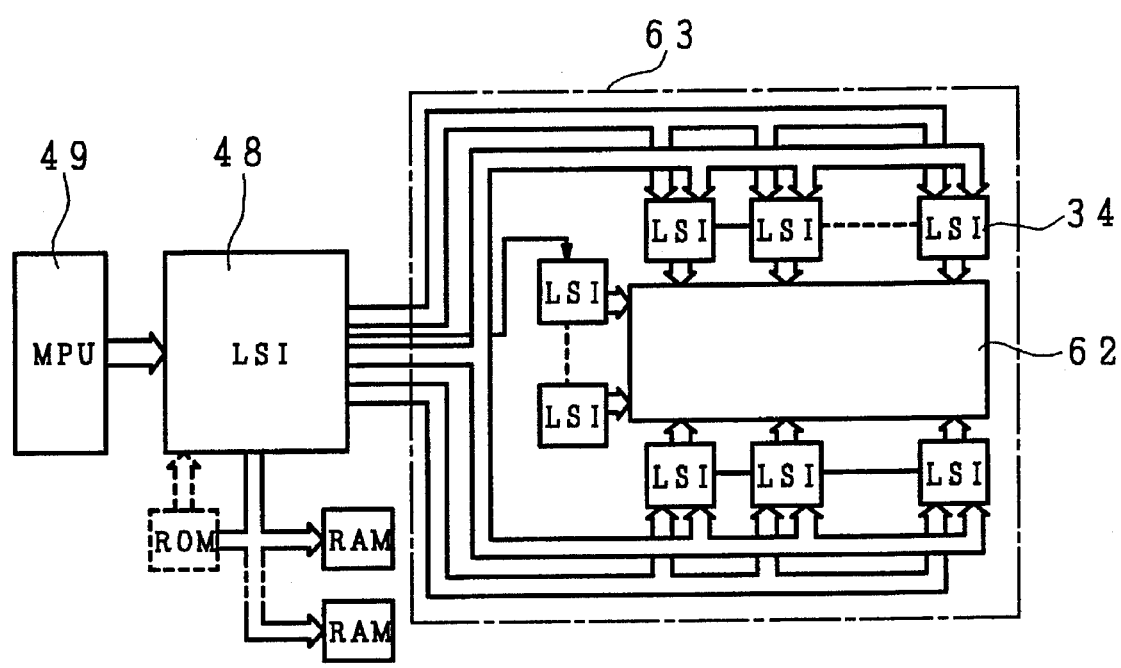
FIG. 10 is a block diagram showing the case in which the liquid crystal display module according to the present invention is used for a display unit of a laptop personal computer.
Figure 11:
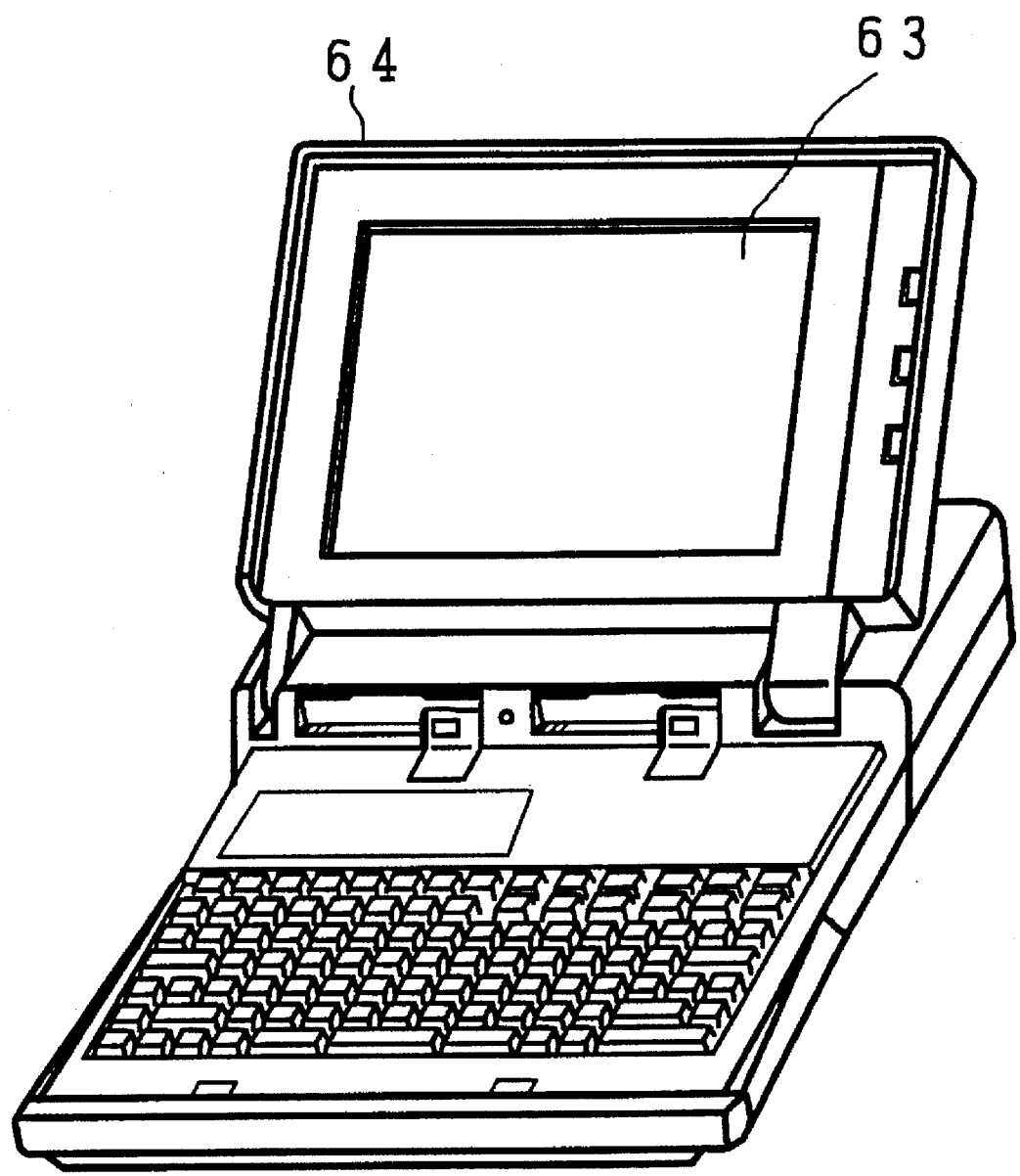
FIG. 11 is an external view showing the case in which the liquid crystal display module according to the present invention is used for the display unit of a laptop personal computer.

FIG. 10 is a block diagram showing the case in which the liquid crystal display module 63 according to the present invention is used for a display unit of a laptop personal computer 64, and FIG. 11 shows the state in which the liquid crystal display module 63 is packaged in the laptop personal computer 64.

In FIG. 10, the computed result produced by a microprocessor 49 is fed through a controlling LSI 48 so that the liquid crystal display module may be driven by a driving IC 34.

According to the present embodiment thus constructed, it is possible to reduce the thickness and weight of the liquid crystal display module in its entirety without reducing the rigidity, and to provide a liquid crystal display module which is freed from any display irregularity caused by the heat generation of the back light source.

Incidentally, the invention as defined in the appended claims should not be limited to the STN type liquid crystal display module described above, but can be likewise applied to another type liquid crystal display module having a back light mounted thereon.

As has been described hereinbefore, according to the present invention, the intermediate frame can have its thickness reduced to reduce the thickness and the weight without reducing the overall rigidity of the liquid crystal display module by making the upper frame of a thin stainless steel sheet and by making the lower frame, to be jointed to the upper frame, of a thin aluminum sheet. Moreover, thanks to the cut-away portions, which extend in a direction perpendicular to the back light source over at least the area of the liquid crystal display panel and which are positioned symmetrically to the line perpendicular to the center portion of the back light source, the cut-away portions, which extend just below the back light source in the longitudinal direction of the back light source, and the notches which are positioned below the two end portions of the back light source, a variety of liquid crystal display modules, which have their heat dissipation effects improved, a uniform temperature distribution established all over the liquid crystal display panel, so that a display irregularity can be prevented, thereby providing an image display of high quality.

We claim:

1. A liquid crystal display module in which display irregularity is suppressed, comprising:

a metallic upper frame having a display window;

a liquid crystal display panel arranged below said upper frame and having a liquid crystal display element and a driver substrate for said liquid crystal display element formed integrally around said liquid crystal display element;

a conductor assembly arranged below said liquid crystal display panel and formed by laminating an optical diffusion plate and a conducting plate;

an intermediate frame arranged below said conductor assembly for accommodating the conductor assembly and having a space formed on at least one side thereof for mounting a linear back light source; and a lower frame arranged below said intermediate frame and jointed to said upper frame for fixing the position of said liquid crystal panel, said conductor assembly and said intermediate frame, which are arranged between said lower frame and said upper frame, wherein said lower frame is formed with cut-away portions of predetermined shapes, which extend just below said back light source in the longitudinal direction of said back light source.

2. A liquid crystal display module according to claim 1, wherein said cut-away portions are formed such that the ratio of the area of said lower frame, which is formed just below said back light source, to the area occupied by said back light source is set to 10% to 50%.

3. A liquid crystal display module according to claim 1, wherein said cut-away portions are formed such that the ratio of the area of said lower frame, which is formed just below said back light source, to the area occupied by said back light source is set to about 30%.

4. A liquid crystal display module according to any one of claims 1 to 3, wherein said upper frame is made of stainless steel and said lower frame is made of aluminum.

5. A liquid crystal display module in which display irregularity is suppressed, comprising:

a metallic upper frame having a display window;

a liquid crystal display panel arranged below said upper frame and having a liquid crystal display element and a driver substrate for said liquid crystal display element formed integrally around said liquid crystal display element;

a conductor assembly arranged below said liquid crystal display panel and formed by laminating an optical diffusion plate and a conducting plate;

an intermediate frame arranged below said conductor assembly for accommodating the conductor assembly and having a space formed on at least one side thereof for mounting a linear back light source; and a lower frame arranged below said intermediate frame and jointed to said upper frame for fixing the position of said liquid crystal panel, said conductor assembly and said intermediate frame, which are arranged between said lower frame and said upper frame, wherein said lower frame is formed with cut-away portions of predetermined shapes, which are positioned just below said back light source; and notches are positioned to correspond to two end portions of said back light source.

6. A liquid crystal display module according to claim 5, wherein said cut-away portions and said notches are formed such that the ratio of the area of said lower frame, which is formed just below said back light source, to the area occupied by said back light source is set to 10% to 50%.

7. A liquid crystal display module according to claim 5, wherein said cut-away portions and said notches are formed such that the ratio of the area of said lower frame, which is formed just below said back light source, to the area occupied by said back light source is set to about 30%.

8. A liquid crystal display module according to anyone of claims 5 to 7, wherein said upper frame is made of stainless steel and said lower frame is made of aluminum.

9. A liquid crystal display module in which display irregularity is suppressed, comprising:

a metallic upper frame having a display window;

a liquid crystal display panel arranged below said upper frame and having a liquid crystal display element and a driver substrate for said liquid crystal display element formed integrally around said liquid crystal display element;

a conductor assembly arranged below said liquid crystal display panel and formed by laminating an optical diffusion plate and a conducting plate;

an intermediate frame arranged below said conductor assembly for accommodating the conductor assembly and having a space formed on at least one side thereof for mounting a linear back light source; and a lower frame arranged below said intermediate frame and jointed to said upper frame for fixing the position of said liquid crystal panel, said conductor assembly and said intermediate frame, which are arranged between said lower frame and said upper frame, wherein said lower frame is formed with first cut-away portions of predetermined shapes, which are positioned just below said back light source; notches are positioned to correspond to two end portion of said back light source;

and second cut-away portions of predetermined shapes, which extend through said back light source over the area corresponding to said liquid crystal display panel and which are positioned symmetrically to a line perpendicular to the longitudinal direction of said back light source.

10. A liquid crystal display module according to claim 9, wherein said first cut-away portions and said notches are formed such that the ratio of the area of said lower frame, which is formed just below said back light source, to the area occupied by said back light source is set to 10% to 50%.

11. A liquid crystal display module according to claim 9, wherein said first cut-away portions and said notches are formed such that the ratio of the area of said lower frame, which is formed just below said back light source, to the area occupied by said back light source is set to about 30%.

12. A liquid crystal display module according to claim 9, wherein said second cut-away portions are formed such that the ratio of the area of said lower frame, which is formed just below said back light source, to the area occupied by said back light source is set to 10% to 50%.

13. A liquid crystal display module according to claim 9, wherein said second cut-away portions are formed such that the ratio of the area of said lower frame, which is formed just below said back light source, to the area occupied by said back light source is set to about 30%.

14. A liquid crystal display module according to any one of claims 9 to 13, wherein said upper frame is made of stainless steel and said lower frame is made of aluminum.

* * * * *